(12) United States Patent
Kaliyamoorthy

(10) Patent No.: US 11,095,510 B2
(45) Date of Patent: Aug. 17, 2021

(54) AGGREGATED NETWORKING DEVICE MAINTENANCE SYSTEM

(71) Applicant: Dell Products L.P., Round Rock, TX (US)

(72) Inventor: Karthi Kaliyamoorthy, Chengalpattu (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/742,498

(22) Filed: Jan. 14, 2020

(65) Prior Publication Data

US 2021/0218628 A1    Jul. 15, 2021

(51) Int. Cl.
| | |
|---|---|
| *H04L 12/24* | (2006.01) |
| *G06F 16/27* | (2019.01) |
| *H04L 12/911* | (2013.01) |
| *H04L 12/709* | (2013.01) |
| *H04L 12/891* | (2013.01) |

(52) U.S. Cl.
CPC .......... *H04L 41/0816* (2013.01); *G06F 16/27* (2019.01); *H04L 41/0681* (2013.01); *H04L 45/245* (2013.01); *H04L 47/41* (2013.01); *H04L 47/82* (2013.01)

(58) Field of Classification Search
None
See application file for complete search history.

(56) References Cited

U.S. PATENT DOCUMENTS

| | | | | |
|---|---|---|---|---|
| 8,630,188 B2 * | 1/2014 | Kotrla | ................ | H04L 41/0659 370/242 |
| 9,270,579 B2 * | 2/2016 | Zhou | ..................... | H04L 45/245 |
| 9,461,877 B1 * | 10/2016 | Nadeau | ................ | H04L 41/042 |
| 10,666,554 B2 * | 5/2020 | Muthukaruppan | ..... | H04L 45/28 |
| 10,742,501 B1 * | 8/2020 | Pianigiani | ............. | H04L 41/082 |
| 10,862,828 B2 * | 12/2020 | Gulbay | ............... | H04L 49/3009 |
| 2002/0049567 A1 * | 4/2002 | Vataja | ...................... | G07C 3/08 702/188 |
| 2015/0106679 A1 * | 4/2015 | Caggioni | ............... | H04J 3/1611 714/776 |

(Continued)

*Primary Examiner* — Lashonda T Jacobs
(74) *Attorney, Agent, or Firm* — Haynes and Boone, LLP

(57) ABSTRACT

An aggregated networking device maintenance system includes a first aggregated networking device and a second aggregated networking device that are coupled together, and each coupled to a third networking device. The first aggregated networking device receives a maintenance instruction and, in response, transmits a first maintenance notification message to the second aggregated networking device, and a second maintenance notification message to the third networking device that prevents the third networking device from transmitting data traffic to the first aggregated networking device. Maintenance operations on the first aggregated networking device may then be performed, and when the first aggregated networking device determines that the maintenance operations have completed, it transmits a first maintenance completed notification message to the second aggregated networking device, and a second maintenance completed notification message to the third networking device that causes the third networking device to resume transmitting data traffic to the first aggregated networking device.

20 Claims, 13 Drawing Sheets

(56) References Cited

U.S. PATENT DOCUMENTS

| | | | |
|---|---|---|---|
| 2015/0124837 A1* | 5/2015 | Saltsidis | H04L 41/0879 370/419 |
| 2015/0256405 A1* | 9/2015 | Janardhanan | H04L 49/354 370/255 |
| 2016/0105306 A1* | 4/2016 | Wu | H04L 45/28 370/221 |
| 2017/0323615 A1* | 11/2017 | Hazra | G09G 3/002 |
| 2018/0324089 A1* | 11/2018 | Subramanian | H04L 45/586 |
| 2018/0331855 A1* | 11/2018 | Subramanian | H04L 12/4625 |
| 2019/0319875 A1* | 10/2019 | Muthukaruppan | H04L 45/245 |
| 2020/0358648 A1* | 11/2020 | Somala | H04L 41/0886 |

\* cited by examiner

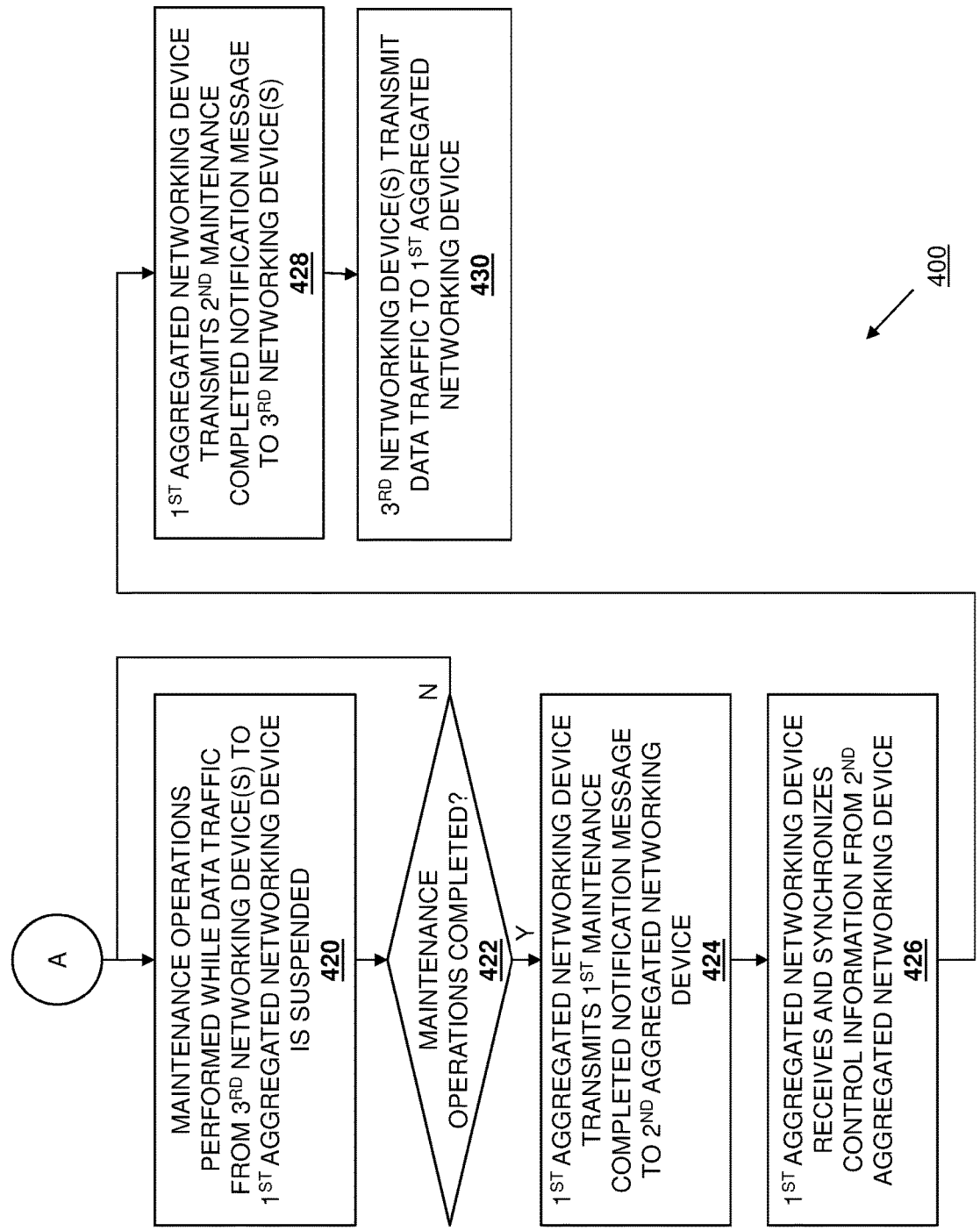

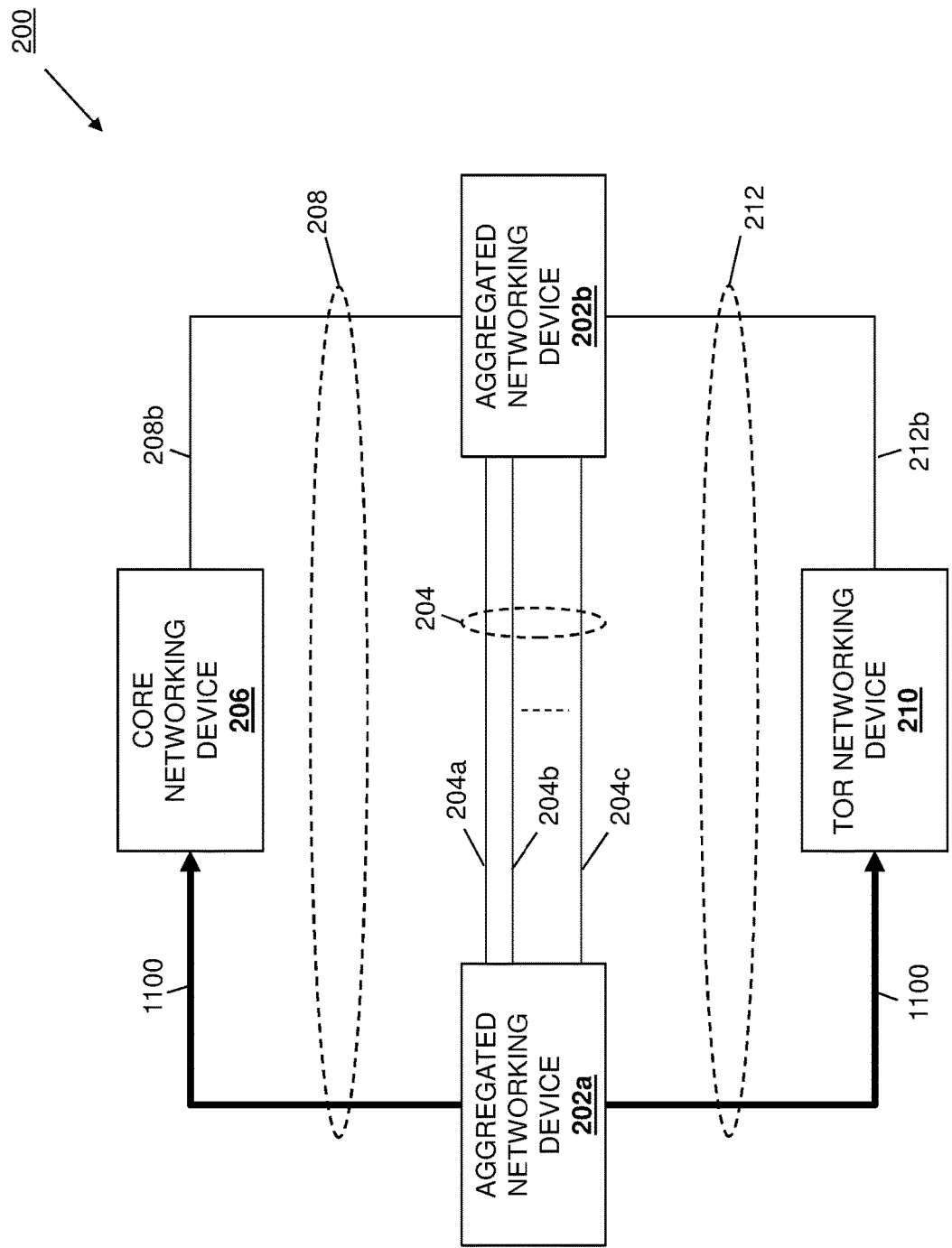

AGGREGATED NETWORKING DEVICE MAINTENANCE SYSTEM

BACKGROUND

The present disclosure relates generally to information handling systems, and more particularly to performing maintenance on aggregated networking information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in the art, are sometimes aggregated to provide a logical switch device that operates using a combination of the resources of those switch devices, while providing redundancy in the event any of those switch devices become unavailable. For example, switch devices may be aggregated using Virtual Link Trunking (VLT), which is a proprietary aggregation protocol available in switch devices provided by DELL® Inc. of Round Rock, Tex., United States, and provides a Layer 2 (L2) link aggregation protocol between end computing devices (e.g., server devices) connected to one or more aggregated switch devices (called "VLT peer switch devices"), while providing a redundant, load-balancing connection to a core network in a loop-free environment in a manner that eliminates the need to use the Spanning Tree Protocol (STP). In one common VLT configuration, a pair of VLT peer switch devices may be coupled together via an aggregated Inter-Chassis Link (ICL) (called a "VLT interconnect" or "VLTi") that is made up of multiple ICLs, with each VLT peer switch device coupled to a core switch device in the core network by a Link Aggregation Group (LAG) that combines multiple links between the VLT peer switch devices and the core switch device, and with each VLT peer switch device also coupled to a Top Of Rack (TOR) switch device by a LAG that combines multiple links between the VLT peer switch devices and the TOR switch device.

In a variety of situations, a user or administrator of the VLT domain may want to perform maintenance on one of the VLT peer switch devices. For example, the user or administrator of the VLT domain may wish to troubleshoot networking issues with one of the VLT peer switch devices, change transceiver modules connected to one of the VLT peer switch devices, replace/reattach/reroute cabling connected to one of the VLT peer switch devices, configure or reconfigure one of the VLT peer switch devices (e.g., configure a port channel mode, a port Maximum Transmission Unit (MTU), a link speed, a duplex mode, a Quality of Service (QoS), Spanning Tree Protocol (STP) interface settings, a trunk mode, a native Virtual Local Area Network (VLAN), and/or other VLT peer switch device configuration parameters known in the art), expand and/or enhance the network connected to one of the VLT peer switch devices, and/or perform other maintenance operations that would be apparent to one of skill in the art in possession of the present disclosure. However, maintenance operations on a VLT peer switch devices can result in any data traffic transmitted to that VLT peer device (e.g., by the core switch device and/or TOR switch device discussed above) being dropped. As such, the user or administrator of the VLT domain must either shut down the entire VLT domain, or manually reconfigure the core switch device and TOR switch device in order to ensure that data traffic is not lost due to that data traffic being forwarded to a VLT peer switch device upon which maintenance is being performed. Thus, maintenance operations on VLT peer switch devices can result in data traffic loss, and conventional solutions to this issue either result in unavailability of the entire VLT domain during the time that the maintenance operations are performed, or require time consuming manual reconfigurations to prevent data traffic loss.

Accordingly, it would be desirable to provide an aggregated networking device maintenance system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a maintenance support engine that is configured to: receive a maintenance instruction; transmit, in response to receiving the maintenance instruction: a first maintenance notification message to a second aggregated networking device; and a second maintenance notification message to a third networking device that is coupled to the second networking device, wherein the second maintenance notification message is configured to prevent the third networking device from transmitting data traffic to a communication system that is connected to the processing system; determine that maintenance operations have completed; and transmit, in response to determining that maintenance operations have completed: a first maintenance completed notification message to the second aggregated networking device; and a second maintenance completed notification message to the third networking device that is configured to cause the third networking device to resume transmitting data traffic to the communication system that is connected to the processing system.

BRIEF DESCRIPTION OF THE DRAWINGS

FIG. 4B is a flow chart illustrating an embodiment of a portion of a method for performing maintenance on an aggregated networking device.

FIG. 11 is a schematic view illustrating an embodiment of the aggregated networking device maintenance system of FIG. 2 operating during the method of FIGS. 4A and 4B.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
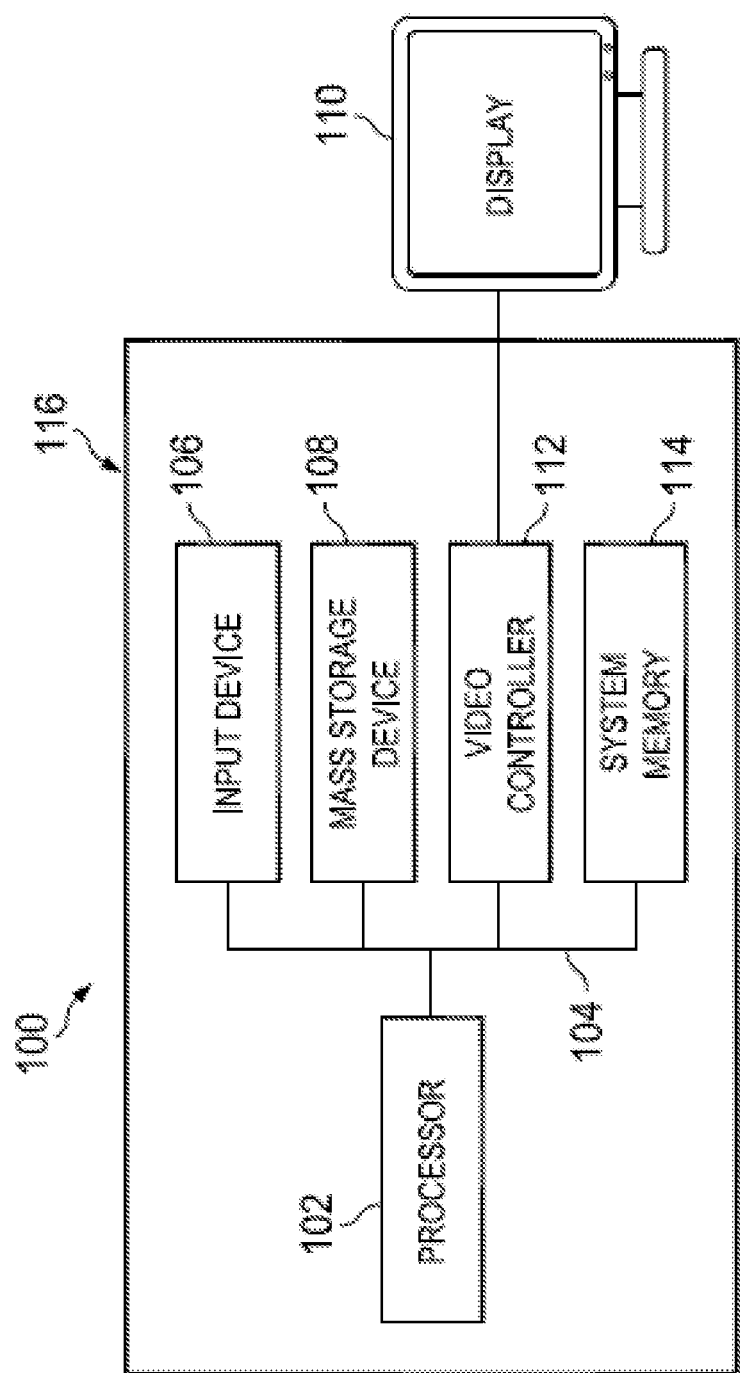
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
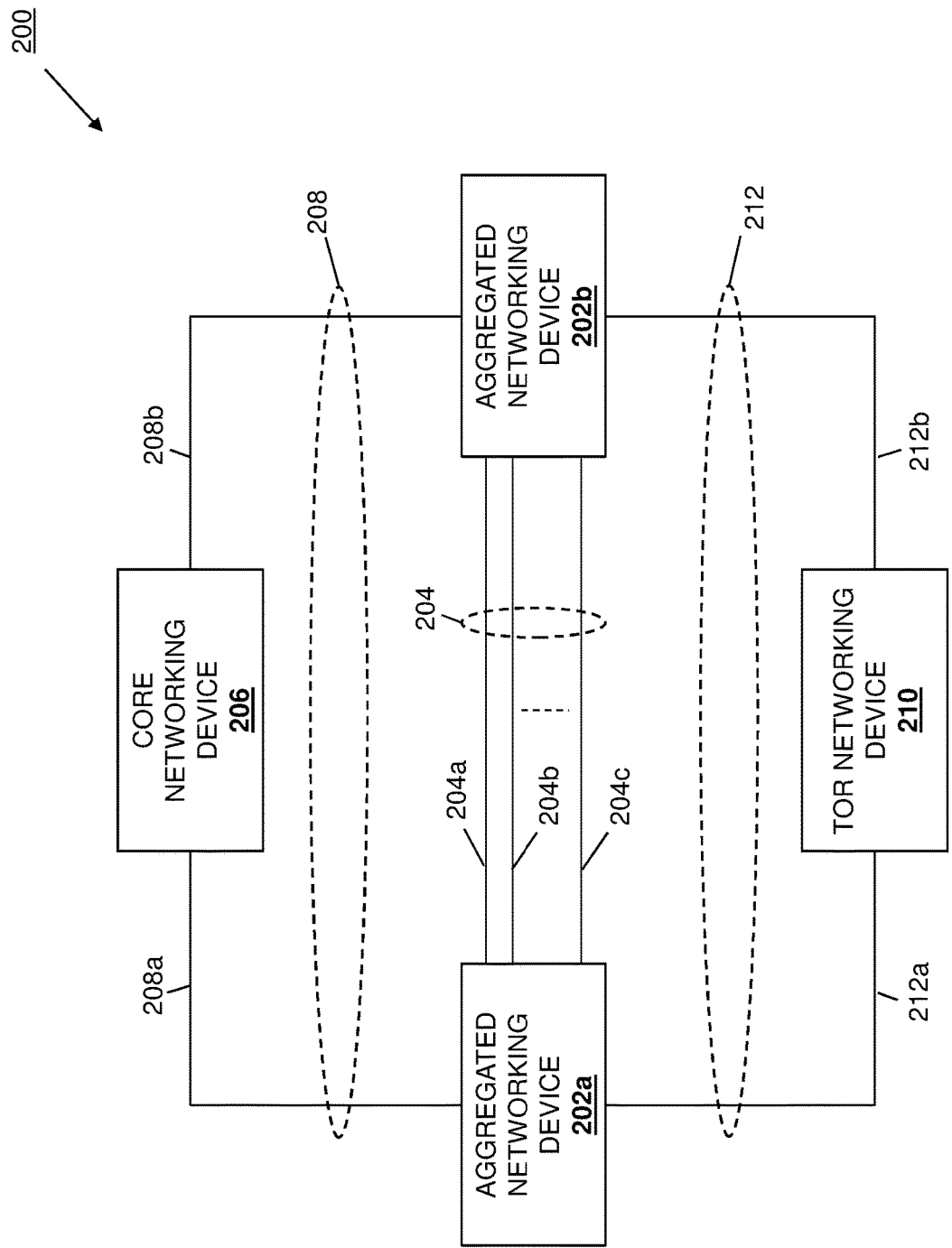
FIG. 2 is a schematic view illustrating an embodiment of an aggregated networking device maintenance system.

Referring now to FIG. 2, an embodiment of an aggregated networking device maintenance system 200 is illustrated. In the illustrated embodiment, the aggregated networking device maintenance system 200 incudes a pair of aggregated networking devices 202a and 202b. In an embodiment, either or both of the aggregated networking devices 202a and 202b may be provided by the IHS 100 discussed above with reference to FIG. 1, and/or may include some or all of the components of the IHS 100, and in specific examples may be provided by switch devices such as the VLT peer switch devices discussed above. However, while illustrated and discussed as being provided by switch devices such as VLT peer switch devices, one of skill in the art in possession of the present disclosure will recognize that aggregated networking devices provided in the aggregated networking device maintenance system 200 may include any devices that may be configured to operate similarly as the aggregated networking devices 202a and 202b discussed below. In the illustrated embodiment, the aggregated networking device 202a and 202b are coupled together by a plurality of Inter-Chassis Links (ICLs) 204a, 204b, and up to 204c, that have been aggregated to provide an aggregated ICL 204. Continuing with the example above in which the aggregated networking devices are provided by VLT peer switch devices, the aggregated ICL 204 may be provided by a VLTi.

Each of the aggregated networking devices 202a and 202b may be coupled to a core networking device 206. In an embodiment, the core networking device 206 may be provided by the IHS 100 discussed above with reference to FIG. 1, and/or may include some or all of the components of the IHS 100, and in specific examples may be provided by a switch device that is coupled to a core network. However, while illustrated and discussed as being provided by a switch device, one of skill in the art in possession of the present disclosure will recognize that core networking devices provided in the aggregated networking device maintenance system 200 may include any devices that may be configured to operate similarly as the core networking device discussed below. In the example illustrated in FIG. 2, the aggregated networking device 202a is coupled to the core networking device 206 by one or more links 208a, the aggregated networking device 202b is coupled to the core networking device 206 by one or more links 208b, and the links 208a and 208b have been aggregated to provide a Link Aggregation Group (LAG) 208. Continuing with the example above in which the aggregated networking devices are provided by VLT peer switch devices, the LAG 208 may be provided by a VLT port channel.

Each of the aggregated networking devices 202a and 202b may also be coupled to a Top Of Rack (TOR) networking device 210. In an embodiment, the TOR networking device 210 may be provided by the IHS 100 discussed above with reference to FIG. 1, and/or may include some or all of the components of the IHS 100, and in specific examples may be provided by a switch device that is coupled to computing devices (e.g., server devices, storage devices, etc.) in a rack. However, while illustrated and discussed as being provided by a switch device, one of skill in the art in possession of the present disclosure will recognize that TOR networking devices provided in the aggregated networking device maintenance system 200 may include any devices that may be configured to operate similarly as the TOR networking device discussed below. In the example illustrated in FIG. 2, the aggregated networking device 202a is coupled to the TOR networking device 210 by one or more links 212a, the aggregated networking device 202b is coupled to the TOR networking device 210 by one or more links 212b, and the links 212a and 212b have been aggregated to provide a LAG 212. Continuing with the example above in which the aggregated networking devices are provided by VLT peer switch devices, the LAG 212 may be provided by a VLT port channel. However, while a specific aggregated networking device maintenance system 200 has been illustrated and described, one of skill in the art in possession of the present disclosure will recognize that the aggregated networking device maintenance system of the present disclosure may include a variety of components and component configurations while remaining within the scope of the present disclosure as well.

Figure 3:
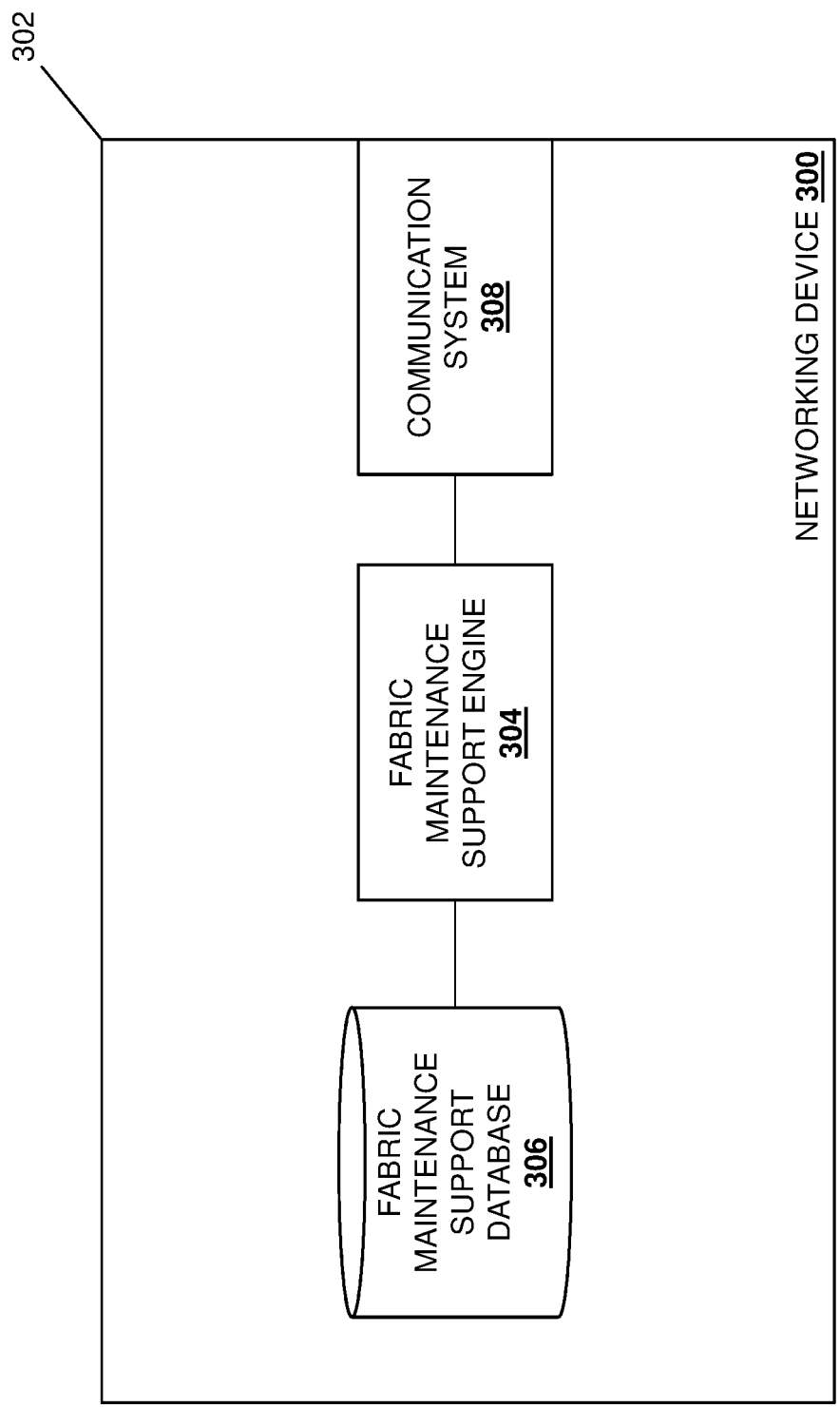
FIG. 3 is a schematic view illustrating an embodiment of a networking device that may be provided in the aggregated networking device maintenance system of FIG. 2.

Referring now to FIG. 3, an embodiment of a networking device 300 is illustrated that may provide either or both of the aggregated networking devices 202a and 202b discussed above with reference to FIG. 2. As such, the networking device 300 may be provided by the IHS 100 discussed above with reference to FIG. 1 and/or may include some or all of the components of the IHS 100, and in specific examples may be provided by VLT peer switch devices and/or other switch devices that would be apparent to one of skill in the art in possession of the present disclosure. Furthermore, while illustrated and discussed as a switch device, one of skill in the art in possession of the present disclosure will recognize that the functionality of the networking device 300 discussed below may be provided by other devices that are configured to operate similarly as the networking device 300 discussed below. In the illustrated embodiment, the networking device 300 includes a chassis 302 that houses the components of the networking device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a fabric maintenance support engine 304 that is configured to perform the functionality of the fabric maintenance support engines and/or networking devices discussed below.

The chassis 302 may also house a storage system (not illustrated, but which may include the storage 108 discussed above with reference to FIG. 1) that is coupled to the fabric maintenance support engine 304 (e.g., via a coupling between the storage system and the processing system) and that includes a fabric maintenance support database 306 that is configured to store any of the information utilized by the fabric maintenance support engine 304 discussed below. The chassis 302 may also house a communication system 308 that is coupled to the fabric maintenance support engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. For example, the communication system may include any of the interfaces and/or ports discussed below that provide the links between the networking devices. However, while a specific networking device 300 has been illustrated, one of skill in the art in possession of the present disclosure will recognize that networking devices (or other devices operating according to the teachings of the present disclosure in a manner similar to that described below for the networking device 300) may include a variety of components and/or component configurations for providing conventional networking device functionality, as well as the functionality discussed below, while remaining within the scope of the present disclosure as well.

Figure 4A:
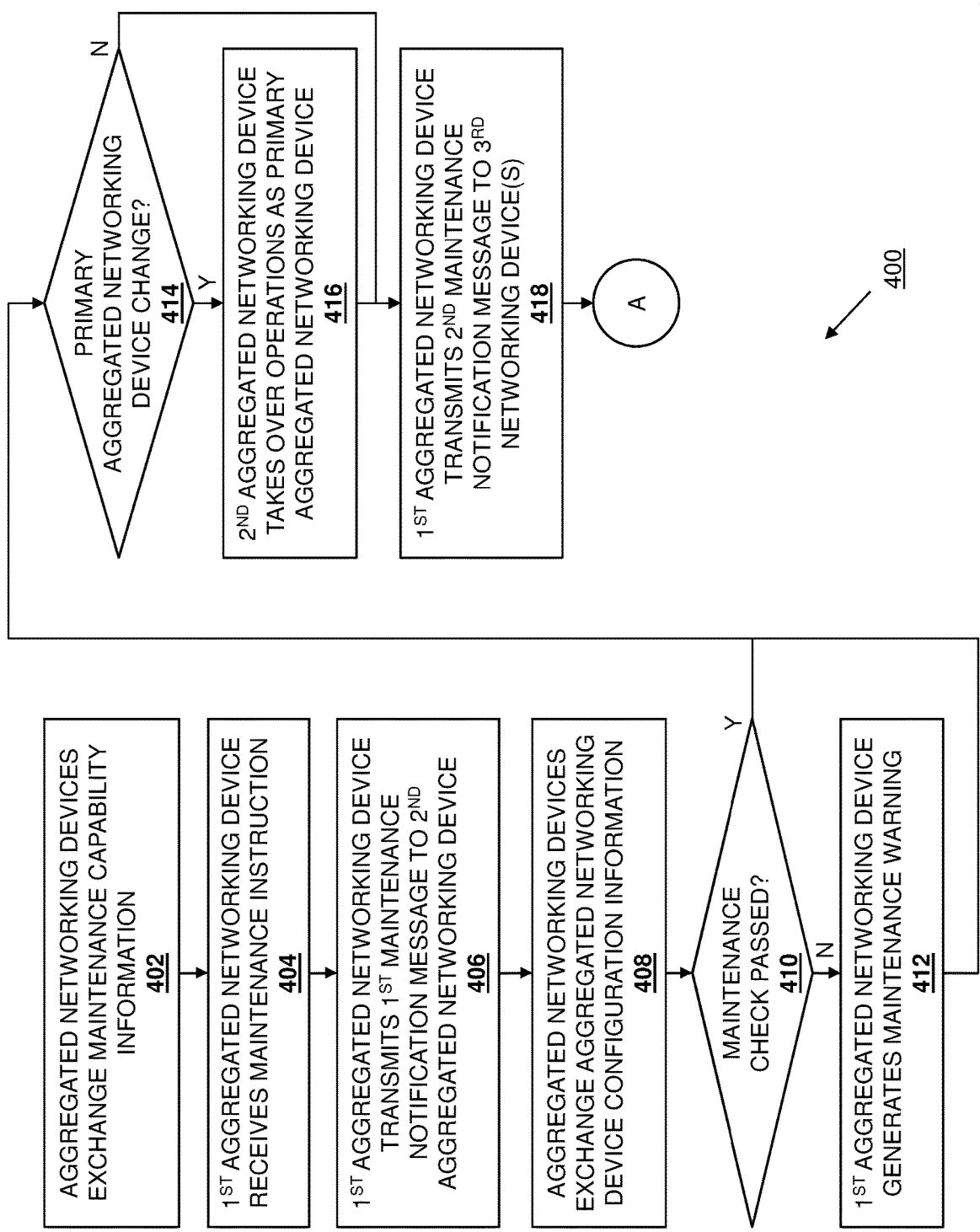
FIG. 4A is a flow chart illustrating an embodiment of a portion of a method for performing maintenance on an aggregated networking device.

Referring now to FIG. 4, an embodiment of a method 400 for performing maintenance on an aggregated networking device is illustrated. As discussed below, the systems and methods of the present disclosure provide a first aggregated networking device that, in response to receiving a maintenance instruction that indicates that the first aggregated networking device is about to undergo maintenance, informs the other aggregated networking device(s) about that maintenance, and instructs other devices coupled to the aggregated networking devices to suspend the transmittal of data traffic to the first aggregated networking device so that data traffic is not lost during the maintenance operations. When the first aggregated networking device determines that the maintenance operations have completed, it informs the other aggregated networking device(s) about the completion of the maintenance operations, and instructs other devices coupled to the aggregated networking devices to resume the transmittal of data traffic to the first aggregated networking device. As such, aggregated networking device maintenance may be performed without the loss of data traffic and without the need for extensive manual user configuration operations associated with conventional aggregated networking device maintenance systems.

Figure 5A:
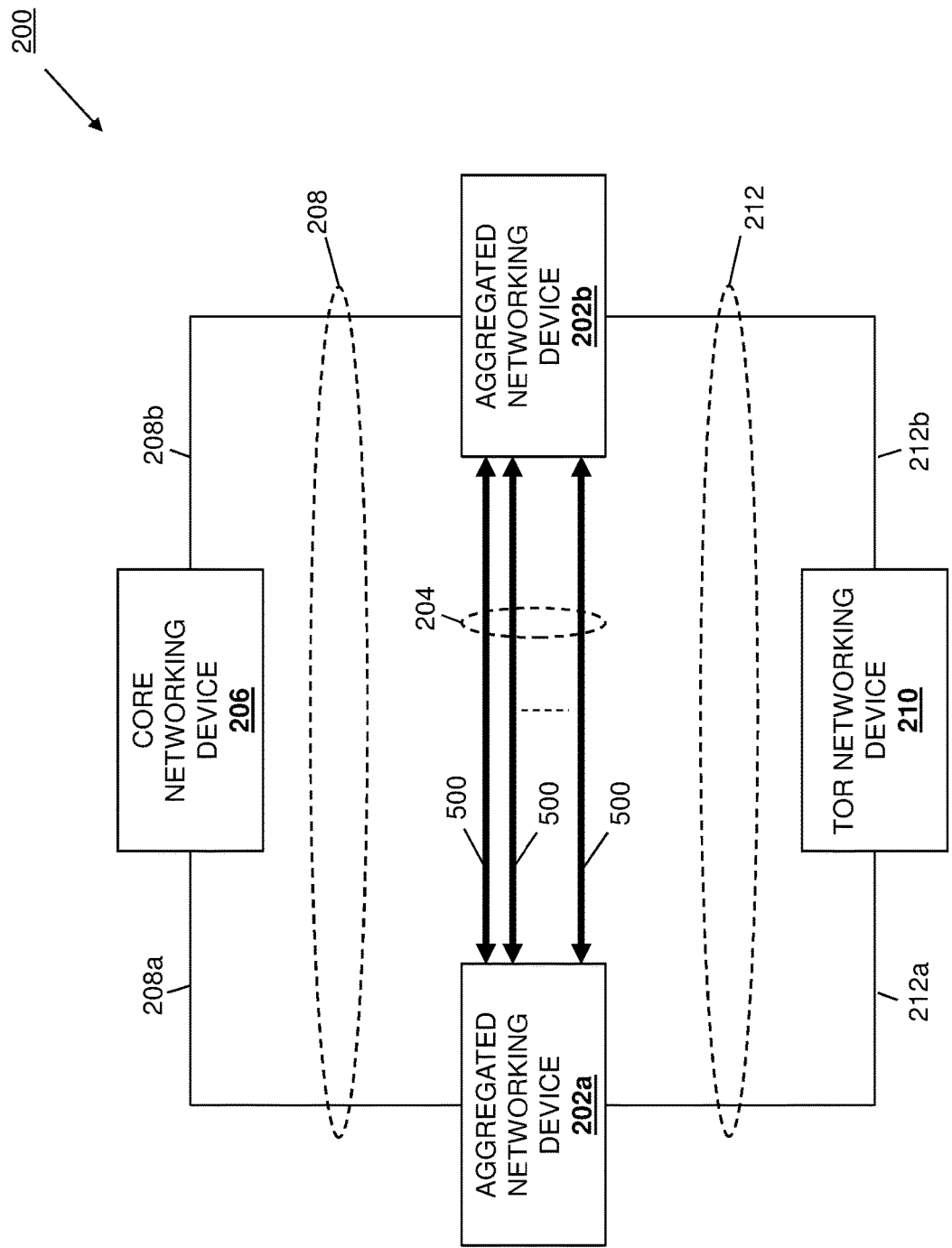
FIG. 5A is a schematic view illustrating an embodiment of the aggregated networking device maintenance system of FIG. 2 operating during the method of FIGS. 4A and 4B.

The method 400 begins at block 402 where aggregated networking devices exchange maintenance capability information. As illustrated in FIG. 5A, in an embodiment of block 402, the aggregated networking devices 202a and 202b may exchange maintenance capability communications 500 via one or more ICLs 204a-204c in the aggregated ICL 204. For example, at block 402 the fabric maintenance support engine 304 in the aggregated networking device 202a/300 may transmit maintenance capability communications 500 via its communication system 308 and over the one or more ICLs 204a-204c in the aggregated ICL 204 such that they are received by the fabric maintenance support engine 304 in the aggregated networking device 202b/300 via its communication system 308. Similarly, at block 402 the fabric maintenance support engine 304 in the aggregated networking device 202b/300 may transmit maintenance capability communications 500 via its communication system 308 and over the one or more ICLs 204a-204c in the aggregated ICL 204 such that they are received by the fabric maintenance support engine 304 in the aggregated networking device 202a/300 via its communication system 308.

Figure 5B:
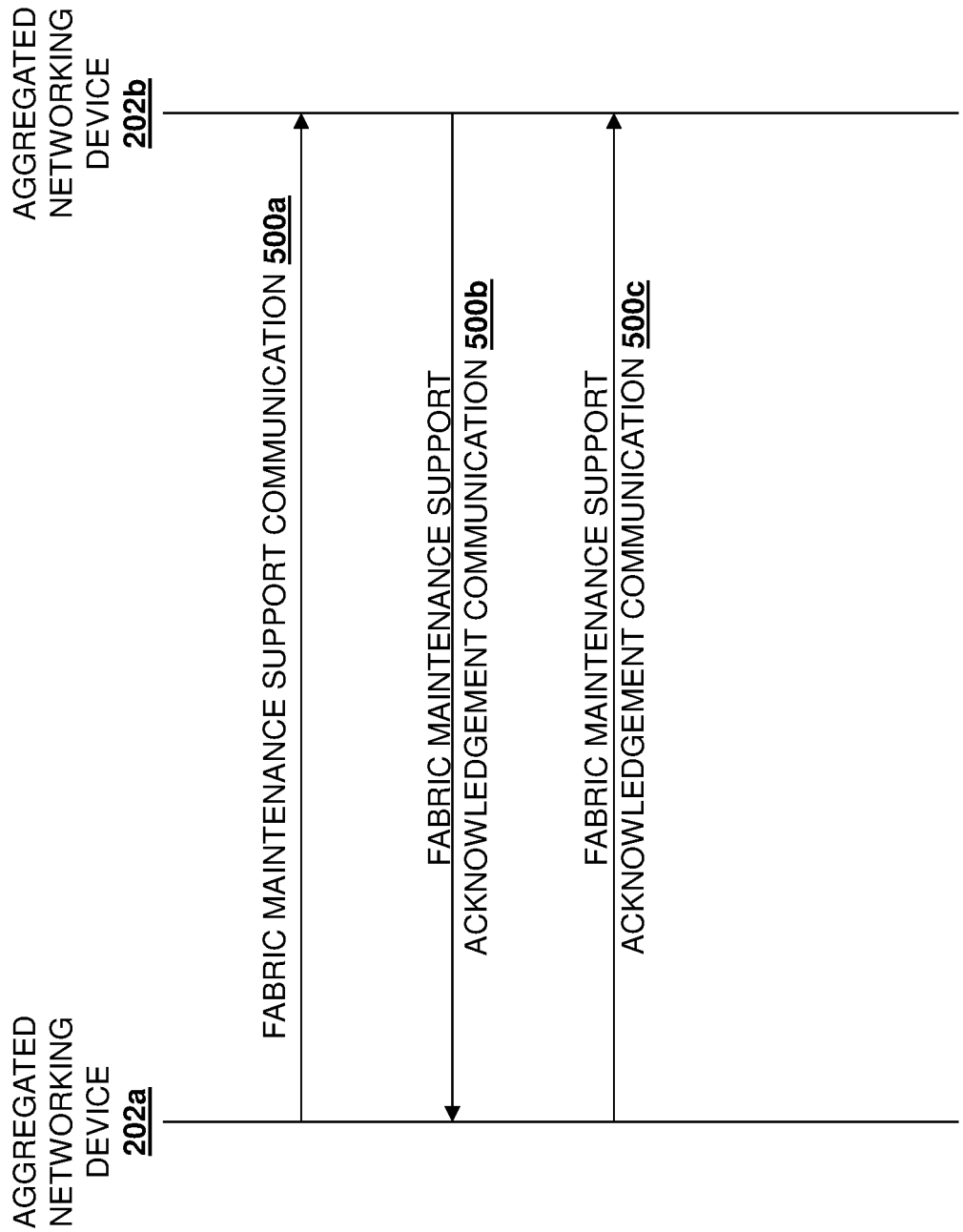
FIG. 5B is a swim lane diagram illustrating an embodiment of communications between aggregated networking devices in the aggregated networking device maintenance system of FIG. 2 during the method of FIGS. 4A and 4B.

With reference to FIG. 5B, in a specific example, the fabric maintenance communications 500 discussed above with reference to FIG. 5A may include the fabric maintenance support engine 304 in the aggregated networking device 202a/300 transmitting a fabric maintenance support communication 500a via its communication system 308 and over the one or more ICLs 204a-204c in the aggregated ICL 204 such that the fabric maintenance support communication 500a is received by the fabric maintenance support engine 304 in the aggregated networking device 202b/300 via its communication system 308. For example, the aggregated networking device 202a may support the fabric maintenance functionality of the present disclosure, and the fabric maintenance support communication 500a may include any fabric maintenance capability information that may, for example, indicate that the aggregated networking device 202a supports the fabric maintenance functionality of the present disclosure, as well as inquiring whether the aggregated networking device 202b supports the fabric maintenance functionality of the present disclosure.

In response to receiving the fabric maintenance support communication 500a, the fabric maintenance support engine 304 in the aggregated networking device 202b/300 may transmit a fabric maintenance support acknowledgement communication 500b via its communication system 308 and over the one or more ICLs 204a-204c in the aggregated ICL 204 such that the fabric maintenance support communication 500b is received by the fabric maintenance support engine 304 in the aggregated networking device 202a/300 via its communication system 308. For example, the aggregated networking device 202b may support the fabric maintenance functionality of the present disclosure, and the fabric maintenance support communication 500b may include any fabric maintenance capability information that may, for example, acknowledges that the fabric maintenance support communication 500a was received, and indicates that the aggregated networking device 202a supports the fabric maintenance functionality of the present disclosure.

Furthermore, in response to receiving the fabric maintenance support acknowledgement communication 500b, the fabric maintenance support engine 304 in the aggregated networking device 202a/300 may transmit a fabric maintenance support acknowledgement communication 500c via its communication system 308 and over the one or more ICLs 204a-204c in the aggregated ICL 204 such that the fabric maintenance support communication 500c is received by the fabric maintenance support engine 304 in the aggregated networking device 202b/300 via its communication system 308. For example, the fabric maintenance support communication 500b may include any fabric maintenance capability information that may, for example, acknowledge that both the aggregated networking devices 202a and 202b support the fabric maintenance functionality of the present disclosure. As such, the aggregated networking devices may perform the "handshake" mechanism illustrated in FIG. 5B to agree upon the use of the fabric maintenance functionality of the present disclosure in the event maintenance is subsequently performed on either of those aggregated networking devices 202 or 202b.

Continuing with the specific example provided above where the aggregated networking devices are VLT peer switch devices, the fabric maintenance communications 500 may be performed as part of a VLT domain-specific negotiation handshake process. However, while specific examples are provided, one of skill in the art in possession of the present disclosure will appreciate that maintenance capability information may be exchanged in a variety of manners that will fall within the scope of present disclosure as well. Furthermore, one of skill in the art in possession of the present disclosure will recognize that in the event one of the aggregated networking devices does not support the fabric maintenance functionality of the present disclosure, the method 400 may end.

The method 400 then proceeds to block 404 where a first aggregated networking device receives maintenance instructions. In an embodiment, at block 404, a user or administrator of the aggregated networking device maintenance system 200 may determine that maintenance will be performed on one of the aggregated networking devices (e.g., the aggregated networking device 202a in the examples below.) As discussed above, a user or administrator of the VLT domain may wish to perform maintenance on one of the aggregated networking devices 202a or 202b to troubleshoot networking issues with one of the aggregated networking devices 202a or 202b, change transceiver modules connected to one of the aggregated networking devices 202a or 202b, replace/reattach/reroute cabling connected to one of the aggregated networking devices 202a or 202b, configure or reconfigure one of the aggregated networking devices 202a or 202b (e.g., configure a port channel mode, a port Maximum Transmission Unit (MTU), a link speed, a duplex mode, a Quality of Service (QoS), Spanning Tree Protocol (STP) interface settings, a trunk mode, a native Virtual Local Area Network (VLAN), and/or other aggregated networking device configuration parameters known in the art), expand and/or enhance the network connected to one of the aggregated networking devices 202a or 202b, and/or perform other maintenance operations on one of the aggregated networking devices 202a or 202b that would be apparent to one of skill in the art in possession of the present disclosure.

As such, at block 404, the user or administrator of the aggregated networking device maintenance system 200 may provide a maintenance instruction to the aggregated networking device 202a using, for example, a Command Line Interface (CLI), a management network, and/or other management interfaces that would be apparent to one of skill in the art in possession of the present disclosure. In response, the fabric maintenance support engine 304 in the aggregated networking device 202a/300 may receive that maintenance instruction (e.g., via its communication system 308.) However, while a specific example of a management instruction has been described, one of skill in the art in possession of the present disclosure will appreciate that management instructions may be received in other manners (e.g., automatically from an application) while remaining within the scope of the present disclosure as well.

Figure 6:
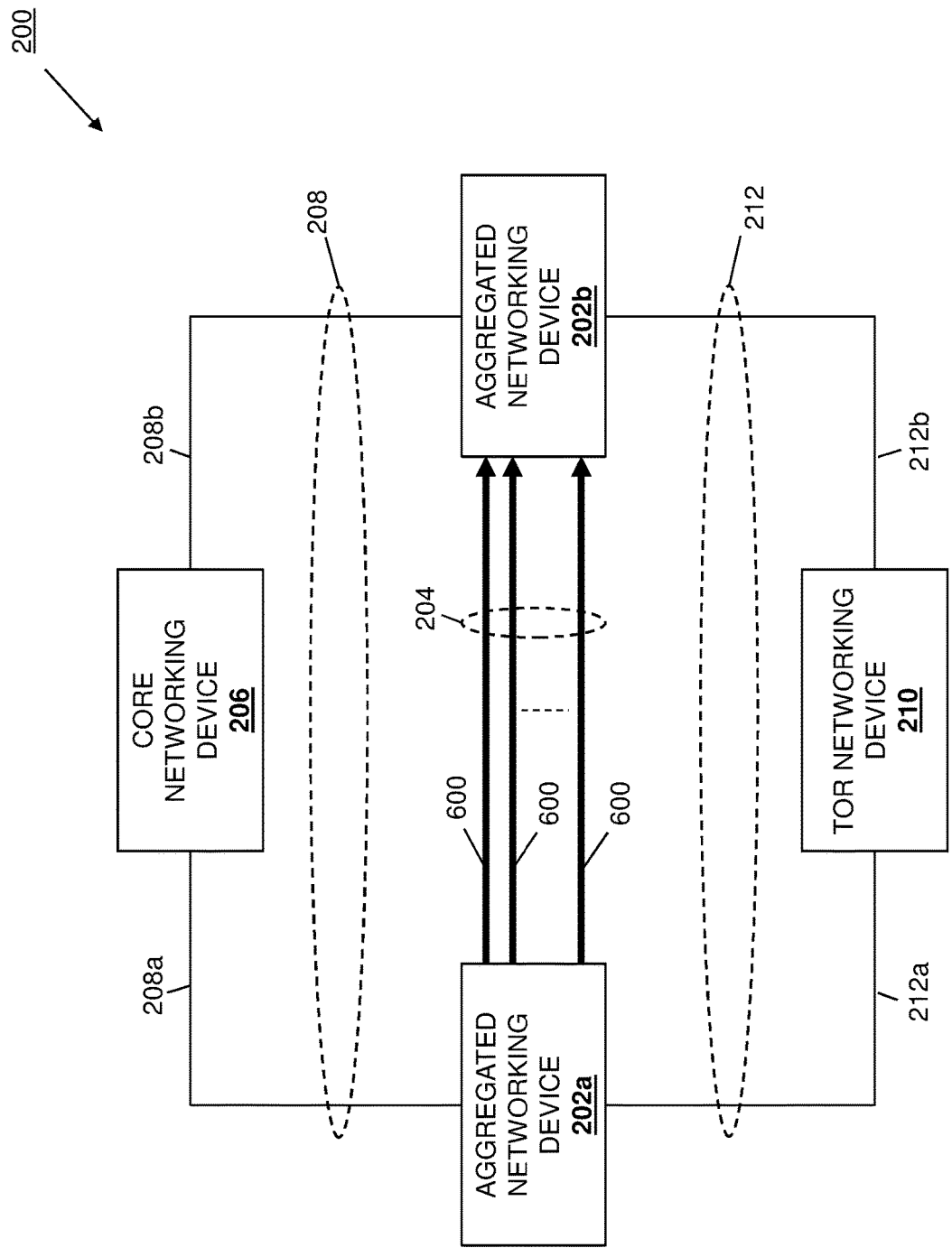
FIG. 6 is a schematic view illustrating an embodiment of the aggregated networking device maintenance system of FIG. 2 operating during the method of FIGS. 4A and 4B.

The method 400 then proceeds to block 406 where the first aggregated networking device transmits a first maintenance notification message to a second aggregated networking device. With reference to FIG. 6, in an embodiment of block 406 and in response to receiving the maintenance instruction at block 404, the fabric maintenance support engine 304 in the aggregated networking device 202a/300 may generate and transmit a first maintenance notification message 600 via its communication system 308 and over the one or more ICLs 204a-204c in the aggregated ICL 204 such that the first maintenance notification message 600 is received by the fabric maintenance support engine 304 in the aggregated networking device 202b/300 via its communication system 308. Continuing with the specific example provided above where the aggregated networking devices are VLT peer switch devices, in an embodiment the first maintenance notification message 600 may be a VLT control communication with a fabric maintenance flag set to indicate that maintenance on the aggregated networking device 202a has been instructed. In addition, in some embodiments, prior to the method 400 the aggregated networking device 202a may be configured to operate as a primary aggregated networking device (e.g., a primary VLT peer switch device) while the aggregated networking device 202b operates as a secondary aggregated networking device (e.g., a secondary VLT peer switch device) and, as discussed in further detail below, the first maintenance notification message 600 may indicate to the aggregated networking device 202b that that the aggregated networking device 202b should take over operating as the primary aggregated networking device.

Figure 7:
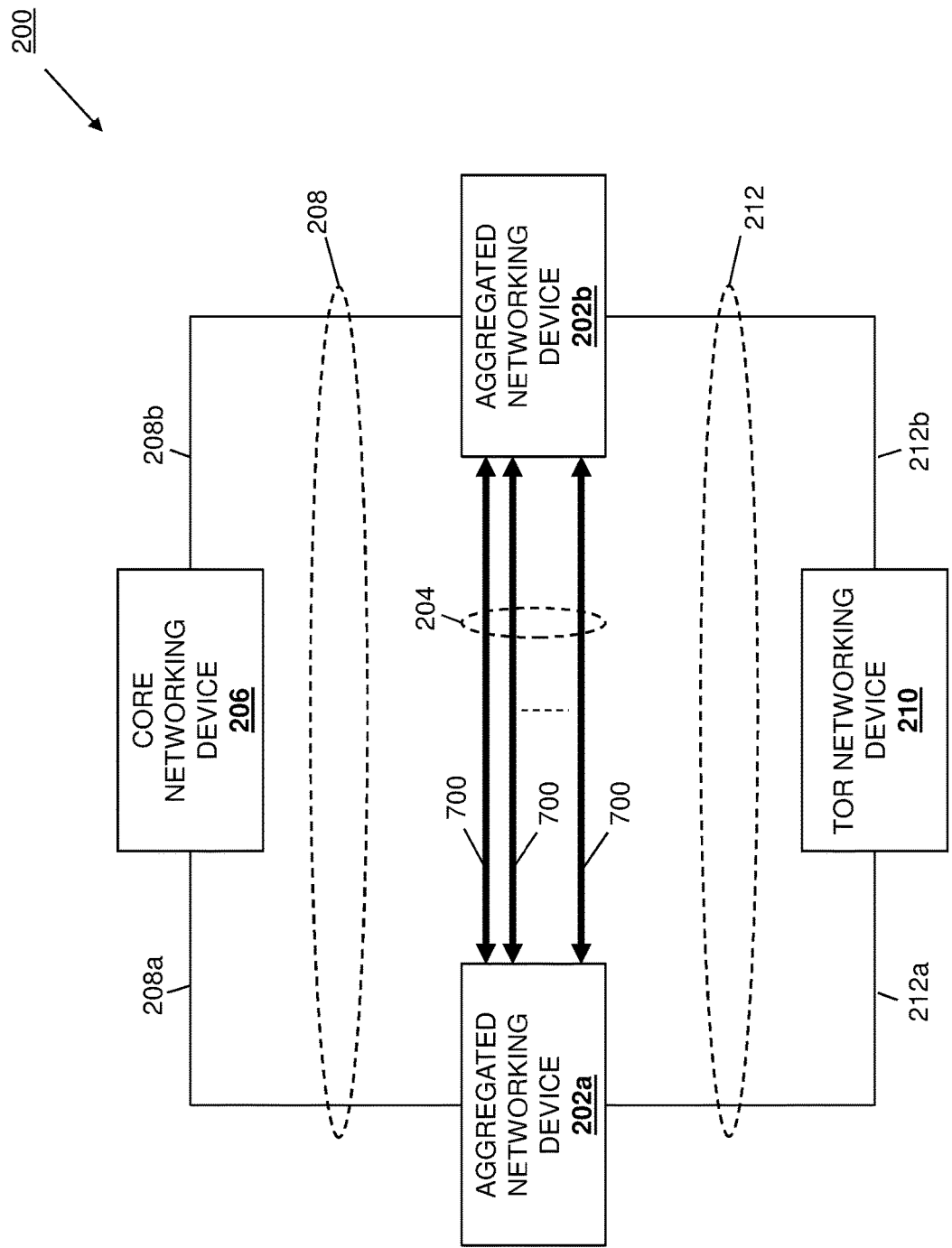
FIG. 7 is a schematic view illustrating an embodiment of the aggregated networking device maintenance system of FIG. 2 operating during the method of FIGS. 4A and 4B.

The method 400 then proceeds to block 408 where the aggregated networking devices exchange aggregated networking device configuration information. As illustrated in FIG. 7, in an embodiment of block 408, the aggregated networking devices 202a and 202b may exchange aggregated networking device configuration communications 700 via one or more ICLs 204a-204c in the aggregated ICL 204. For example, at block 402 the fabric maintenance support engine 304 in the aggregated networking device 202a/300 may transmit aggregated networking device configuration communications 700 via its communication system 308 and over the one or more ICLs 204a-204c in the aggregated ICL 204 such that they are received by the fabric maintenance support engine 304 in the aggregated networking device 202b/300 via its communication system 308. Similarly, at block 402 the fabric maintenance support engine 304 in the aggregated networking device 202b/300 may transmit aggregated networking device configuration communications 700 via its communication system 308 and over the one or more ICLs 204a-204c in the aggregated ICL 204 such that they are received by the fabric maintenance support engine 304 in the aggregated networking device 202a/300 via its communication system 308.

In a specific example, the aggregated networking device configuration information exchanged via the aggregated networking device configuration communications 700 at block 408 may identify a number of LAGs (e.g., a number of VLT port-channels and VLT port-channel members for VLT peer switch devices) provided by the aggregated networking devices 202a and 202b, a number of Address Resolution Protocol (ARP) entries (e.g., in the fabric maintenance support database 306) in each of the aggregated networking devices 202a and 202b, a number of Media Access Control (MAC) address entries (e.g., in the fabric maintenance support database 306) in each of the aggregated networking devices 202a and 202b, a number of Internet Group Management Protocol (IGMP) entries (e.g., in the fabric maintenance support database 306) in each of the aggregated networking devices 202a and 202b, and/or any other aggregated networking device configuration information that would be apparent to one of skill in the art in possession of the present disclosure. As such, in some embodiments of block 408, each aggregated networking device 202a and 202b may receive the aggregated networking device configuration information from the other aggregated networking device and, in response, may generate a maintenance check table that includes the aggregated networking device configuration information for each of those aggregated networking device 202a and 202b. For example, the fabric maintenance support engine 304 in the aggregated networking device 202a/300 (provided by a VLT peer switch device in this example) may generate the following maintenance check table at block 408:

| FEATURE | VLT PEER SWITCH DEVICE 202A | VLT PEER SWITCH DEVICE 202B | MAINTENANCE COMPATIBILITY |
|---|---|---|---|
| VLT PORT CHANNEL | 11 | 11 | YES |
| MEMBER | 8 | 8 | YES |
| ARP ENTRIES | 1000 | 1000 | YES |
| MAC ENTRIES | 1000 | 1000 | YES |
| IGMP ENTRIES | 1000 | 1000 | YES |

As will be appreciated by one of skill in the art in possession of the present disclosure, aggregated networking device configuration information exchanged by properly operating aggregated networking devices should match, and the example of the maintenance check table above illustrates a situation where a pair of VLT peer switch devices exchange matching VLT peer switch device configuration information (e.g., each VLT peer switch device provides the same number of VLT-port channels with the same number of VLT port-channel members, and includes the same number of ARP entries, MAC entries, and IGMP entries) such that each feature provided by those VLT peer switch devices is designated "maintenance compatible" in the maintenance check table.

However, as discussed below, differences in the aggregated networking device configuration information exchanged by the aggregated networking devices will result in a maintenance check table that indicates whether either of the aggregated networking devices 202a and 202b are not operating properly. For example, as will be appreciated by one of skill in the art in possession of the present disclosure, if the aggregated networking device 202b provided by a VLT peer switch device provides a lower number of VLT port channels and VLT port-channel members than the aggregated networking device 202a provided by a VLT peer switch device, that may indicate that one or more links to the aggregated networking device 202b are unavailable. However, while a specific technique for comparing aggregated networking device configuration information has been described, one of skill in the art in possession of the present disclosure will appreciate that aggregated networking device configuration information may be analyzed in a variety of manners that will fall within the scope of the present disclosure as well.

The method 400 then proceeds to decision block 410 where it is determined whether a maintenance check has been passed. In an embodiment, at decision block 410, the fabric maintenance support engine 304 in the aggregated networking device 202a/300 may operate to determine whether a maintenance check has been passed by reviewing the aggregated networking device configuration information in its maintenance check table which, as discussed below, may indicate whether the aggregated networking devices 202a and 202b are operating properly or not (i.e., whether any links to either of the aggregated networking devices 202 and 202b are unavailable.) As such, in a specific example, the fabric maintenance support engine 304 in the aggregated networking device 202a/300 may analyze the maintenance check table to determine whether diverting all data traffic to the aggregated networking device 202b will cause issues (e.g., in the event links are unavailable to the aggregated networking device 202b such that it is not capable of handling all of that data traffic.) However, while a specific technique for performing a maintenance check is described, one of skill in the art in possession of the present disclosure will appreciate that maintenance checks to determine if issues will arise in response to diverting data traffic to perform maintenance operations may be performed in a variety of manners that will fall within the scope of the present disclosure as well.

If, at decision block 410, it is determined that the maintenance check has not been passed, the method 400 proceeds to block 412 where the first aggregated networking device generates a maintenance warning. In an embodiment, at block 412, the fabric maintenance support engine 304 in the aggregated networking device 202a/300 may generate a maintenance warning in response to determining that the maintenance check has not been passed (e.g., that links are unavailable to the aggregated networking device 202b such that it may not be capable of handling all of the data traffic that was previously being transmitted to the aggregated networking device 202a.) For example, the warning generated in response to determining that the maintenance check has not been passed may be a warning that the maintenance should not be performed (e.g., because it has been determined that the data traffic loss will exceed a threshold if all data traffic is diverted to the aggregated networking device 202b), and the method 400 may end. However, in another example, the warning generated in response to determining that the maintenance check has not been passed may be a warning that identifies the maintenance check has not been passed, and that may give the user or administrator of the aggregated networking device maintenance system 200 an option to proceed with maintenance (e.g., because the possible data traffic loss if all data traffic is diverted to the aggregated networking device 202b is deemed acceptable), and thus following block 412 the method 400 may end (if the user or administrator chooses not to proceed with maintenance), or may proceed to block 414 (if the user or administrator chooses to proceed with maintenance.)

If at decision block 410, it is determined that the maintenance check has been passed, and in some embodiments following block 412, the method 400 proceeds to decision block 414 where it is determined whether a primary aggregated networking device change is required. As discussed above, one of the aggregated networking devices 202a and 202b may operate as a primary aggregated networking device, with the other aggregated networking device operating as a secondary aggregated networking device. In the event maintenance operations are to-be performed on the aggregated networking device operating as the primary aggregated networking device, the aggregated networking device operating as the secondary aggregated networking device may operate to take over operations as the primary aggregated networking device. For example, the aggregated networking device 202a may be operating as the primary aggregated networking device prior to receiving the maintenance instruction and, as discussed above, the first maintenance notification message 600 may indicate to the aggregated networking device 202b that that the aggregated networking device 202b should take over operating as the primary aggregated networking device from the aggregated networking device 202a. As such, in an embodiment of decision block 414, the fabric maintenance support engine 304 in the aggregated networking device 202b/300 may determine whether the first maintenance notification message 600 indicates that the aggregated networking device 202b should take over operating as the primary aggregated networking device. However, while a specific example, has been provided, one of skill in the art in possession of the present disclosure will recognize that primary aggregated networking device switchover may be performed in a variety of manners that will fall within the scope of the present disclosure as well.

If, at decision block 414, it is determined that a primary aggregated networking device change is required, the method 400 proceeds to block 416 where the second aggregated networking device takes over operations as a primary aggregated networking device from the first aggregated networking device. In an embodiment, at decision block 414 the fabric maintenance support engine 304 in the aggregated networking device 202b/300 may determine that the first maintenance notification message 600 indicates that the aggregated networking device 202b should take over operating as the primary aggregated networking device and, in response, at block 416 the aggregated networking device 202b may operate to take over operating as the primary aggregated networking device from the aggregated networking device 202a. As will be appreciated by one of skill in the art in possession of the present disclosure, the taking over of the operations as the primary aggregated networking device from the aggregated networking device 202a may include a variety of primary aggregated networking device switchover operations that are known in the art, and thus are not described herein in detail. As such, following block 416, the fabric maintenance support engine 304 in the aggregated networking device 202b may operate at the primary aggregated networking device, which one of skill in the art in possession of the present disclosure will appreciate may include performing any of the computational processes associated with the networking device aggregation.

Figure 8:
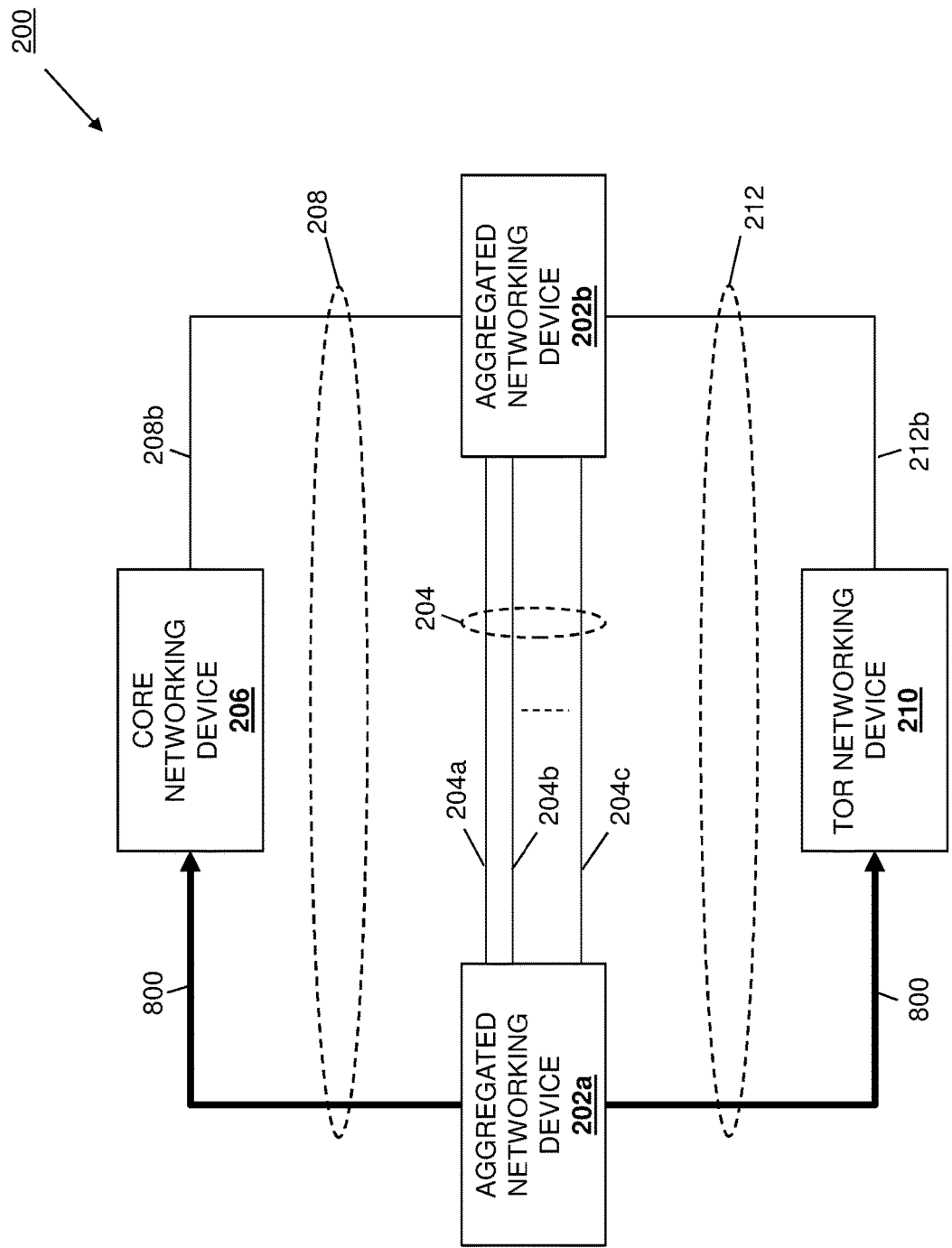
FIG. 8 is a schematic view illustrating an embodiment of the aggregated networking device maintenance system of FIG. 2 operating during the method of FIGS. 4A and 4B.

If at decision block 414, it is determined that a primary aggregated networking device change is not required, or following block 416, the method 400 proceeds to block 418 where the first aggregated networking device transmits a second maintenance notification message to one or more third networking devices. In an embodiment, in response to the determination at decision block 414 by the fabric maintenance support engine 304 in the aggregated networking device 202a/300 that the aggregated networking device 202b does not need to take over operating as the primary aggregated networking device (e.g., the aggregated networking device 202b may already be operating as the primary aggregated networking device), or following the primary aggregated networking device change at block 416, at block 418 the fabric maintenance support engine 304 in the aggregated networking device 202a/300 may generate and transmit second maintenance notification messages via its communication system 308 to one or more third networking devices. For example, FIG. 8 illustrates how the fabric maintenance support engine 304 in the aggregated networking device 202a/300 may generate and transmit second maintenance notification communications 800 including second maintenance notification messages via its communication system 308 and to each of the core networking device 206 and the TOR networking device 210.

In a specific example, the second maintenance notification communications 800 transmitted at block 418 may be provided by graceful Link Aggregation Control Protocol (LACP) Protocol Data Units (PDUs) that instruct the core networking device 206 and the TOR networking device 210 to exclude their respective link(s) 208a and 212a to the aggregated networking device 202a as part of their respective LAGs 208 and 212. As will be appreciated by one of skill in the art in possession of the present disclosure, the second maintenance notification communications 800 may include any of a variety of information and/or instructions that operate to prevent the sending of data traffic by the core networking device 206 and the TOR networking device 210 to the aggregated networking device 202a by, for example, re-hashing any data traffic (e.g., Layer 2 (L2), Layer 3 (L3), and/or multicast data traffic) such that it is forwarded to the aggregated networking device 202b. Continuing with the example in which the second maintenance notification communications 800 are LACP communications, the second maintenance notification communications 800 may include the following code in order modify the LACP state machine to prevent the sending of data traffic by the core networking device 206 and the TOR networking device 210 to the aggregated networking device 202a:
Enable_Maintenance( );Actor.Sync=FALSE; ActorMaintenance=TRUE;ActorDistributing=FALSE; NTT=TRUE;wtr_waiting=FALSE As such, one of skill in the art in possession of the present disclosure will recognize that each of the core networking device 206 and the TOR networking device 210 may receive the second maintenance notification communications 800 at block 418 and, in response, may transmit all further data traffic received subsequent to the second maintenance notification communications 800 to the aggregated networking device 202b. One of skill in the art in possession of the present disclosure will appreciate that the use of graceful LACP PDUs to cause the data traffic to be forwarded to the aggregated networking device 202b may operate to prevent the loss of any data traffic due to the subsequent maintenance operations (i.e., as that data traffic will be forwarded to the aggregated networking device 202b immediately following the receiving of the graceful LACP PDUs.) Furthermore, subsequent to sending the second maintenance notification communications 800, the fabric maintenance support engine 304 in the aggregated networking device 202a/300 may configure its ports in its communication system 308 (i.e., that are coupled to the core networking device 206 and the TOR networking device 210) in a maintenance state that does not transmit or receive LACP PDUs.

The method 400 then proceeds to block 420 where maintenance operations are performed while data traffic from the third networking device(s) to the first aggregated networking device is suspended. In an embodiment, at block 420, maintenance operations may be performed on the aggregated networking device 202a while the core networking device 206 and the TOR networking device 210 transmit data traffic to the aggregated networking device 202b, and do not transmit data traffic to the aggregated networking device 202a. As such, as discussed above, the core networking device 206 and the TOR networking device 210 may transmit data traffic to the aggregated networking device 202b and not transmitting data traffic to the aggregated networking device 202a while a user or administrator performs maintenance on the aggregated networking device 202a to troubleshoot networking issues with the aggregated networking device 202a, change transceiver modules connected to the aggregated networking device 202a, replace/reattach/reroute cabling connected to the aggregated networking device 202a, configure or reconfigure the aggregated networking device 202a (e.g., configure a port channel mode, a port Maximum Transmission Unit (MTU), a link speed, a duplex mode, a Quality of Service (QoS), Spanning Tree Protocol (STP) interface settings, a trunk mode, a native Virtual Local Area Network (VLAN), and/or other aggregated networking device configuration parameters known in the art), expand and/or enhance the network connected to the aggregated networking device 202a, and/or perform other maintenance operations on the aggregated networking device 202a that would be apparent to one of skill in the art in possession of the present disclosure.

The method 400 then proceeds to decision block 422 where it is determined whether maintenance operations have been completed. In an embodiment, at decision block 422, the fabric maintenance support engine 304 in the aggregated networking device 202a/300 may monitor the maintenance operations to determine if they have been completed by, for example, monitoring for a maintenance complete command, detecting a reset, reboot, and/or other initialization of the aggregated networking device 202a, or determining that a time period has expired. However, while a few specific examples have been provided, one of skill in the art in possession of the present disclosure will appreciate that the completion of maintenance operations may be monitored using a variety of techniques other than those listed above while falling within the scope of the present disclosure as well. If, at decision block 422, it is determined that the maintenance operations have not been completed, the method 400 returns to block 420. As such, the method 400 may loop through blocks 420 and 422 to perform maintenance operations on the aggregated networking device 202a as long as those maintenance operations have not been completed. In an embodiment, during maintenance operations, maintenance messages (e.g., fabric-maintenance-related control information) may be exchanged between the aggregated networking devices 202a and 202b via the aggregated ICL 204, but no ARP entries, MAC entries, multicast synchronization operations, and/or other control information/operations may be exchanged/conducted via the aggregated ICL 204.

Figure 9:
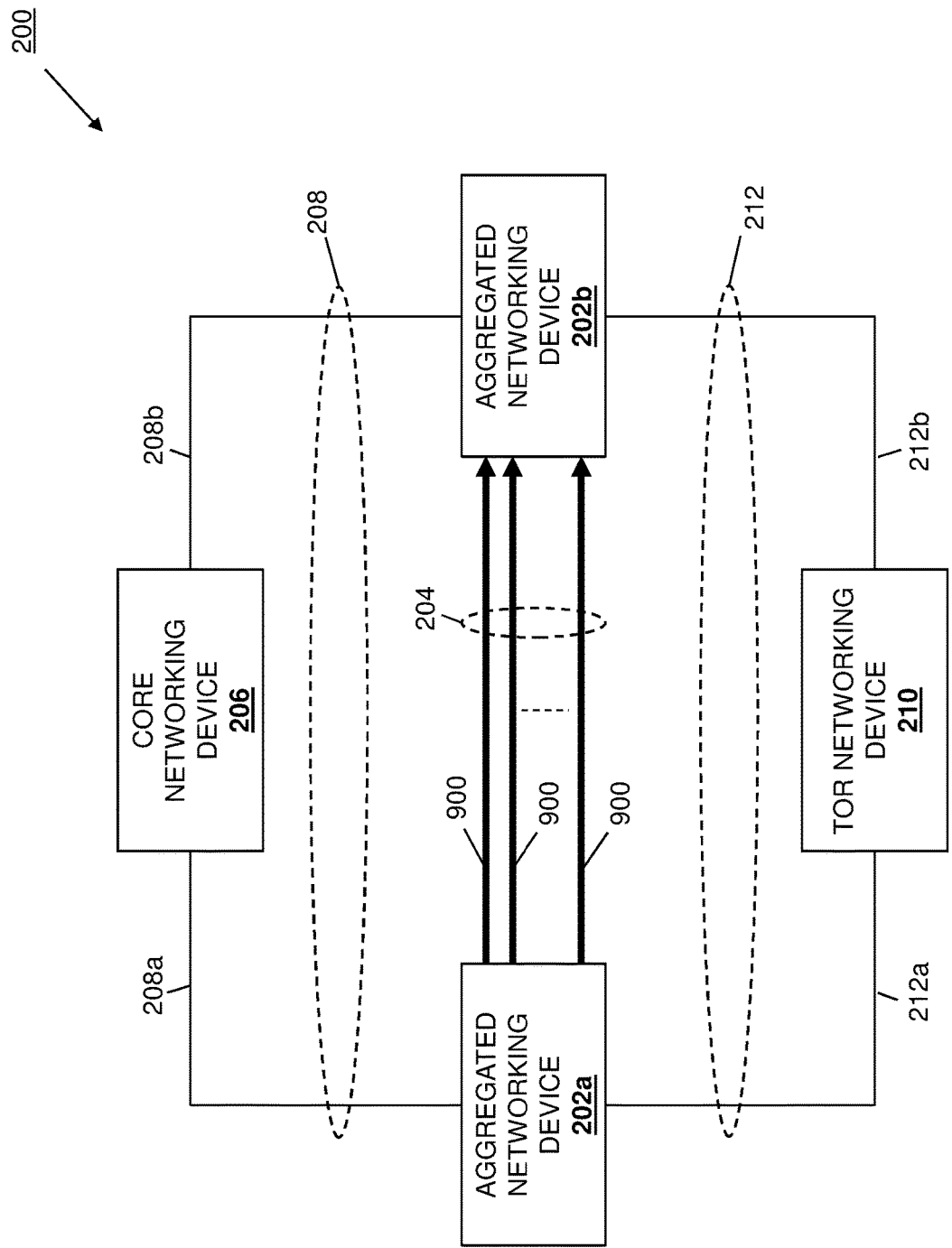
FIG. 9 is a schematic view illustrating an embodiment of the aggregated networking device maintenance system of FIG. 2 operating during the method of FIGS. 4A and 4B.

If at decision block 422, it is determined that maintenance operations have been completed, the method 400 proceeds to block 424 where the first aggregated networking device transmits a first maintenance completed notification message to the second aggregated networking device. With reference to FIG. 9, in response to determining that the maintenance operations have completed at decision block 422, at block 424 the fabric maintenance support engine 304 in the aggregated networking device 202a/300 may operate to generate and transmit a first maintenance completed notification communication 900 including a first maintenance notification completion message via its communication system 308 and over the one or more ICLs 204a-204c in the aggregated ICL 204 such that they are received by the fabric maintenance support engine 304 in the aggregated networking device 202b/300 via its communication system 308. As will be appreciated by one of skill in the art in possession of the present disclosure, the first maintenance notification completion message may include any information that indicates to the aggregated networking device 202b that the maintenance operations on the aggregated networking device 202a have completed.

Figure 10:
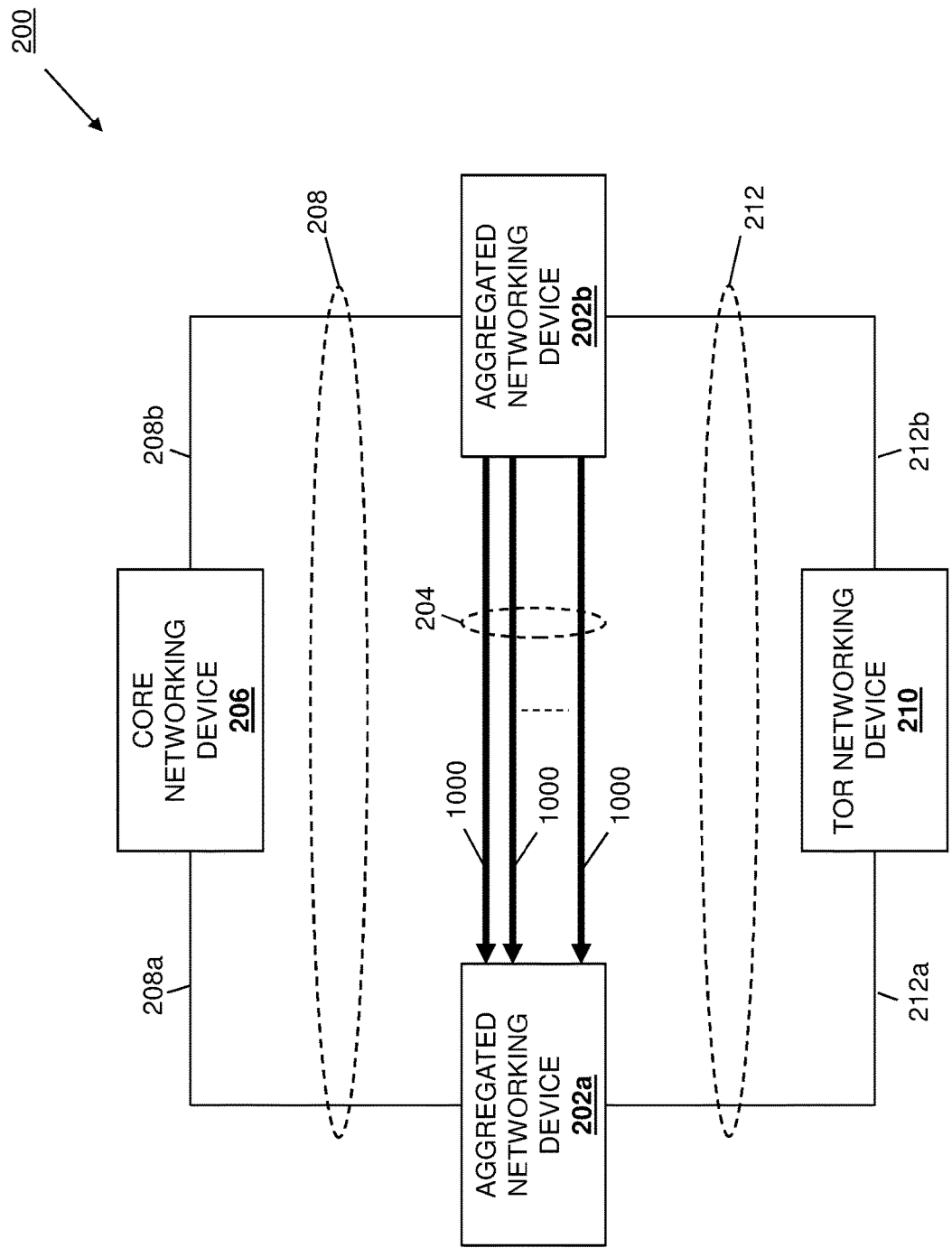
FIG. 10 is a schematic view illustrating an embodiment of the aggregated networking device maintenance system of FIG. 2 operating during the method of FIGS. 4A and 4B.

The method 400 then proceeds to block 426 where the first aggregated networking device receives and synchronizes control information from the second aggregated networking device. With reference to FIG. 10, in an embodiment of block 426 and in response to receiving the first maintenance completed notification communication 900 from the aggregated networking device 202a, the fabric maintenance support engine 304 in the aggregated networking device 202b/300 may operate to transmit control communications 1000 including control information via its communication system 308 and over the one or more ICLs 204a-204c in the aggregated ICL 204 such that they are received by the fabric maintenance support engine 304 in the aggregated networking device 202a/300 via its communication system 308. As will be appreciated by one of skill in the art in possession of the present disclosure, the control information may include any information that was modified and/or updated on the aggregated networking device 202b during the maintenance operations on the aggregated networking device 202a, and that must be included on the aggregated networking device 202a in order for the aggregated networking device 202a to operate properly with the aggregated networking device 202b (i.e., as part of the aggregation.) As such, in response to receiving the control communications 1000, the fabric maintenance support engine 304 in the aggregated networking device 202a/300 may operate to synchronize the control information received from the aggregated networking device 202b with the control information stored in its fabric maintenance support database 306. In an embodiment, upon the completion of the synchronization of the control information, the fabric maintenance support engine 304 in the aggregated networking device 202a/300 may clear the maintenance state from the ports in its communication system 308, thus allowing those port to be aggregated (e.g., as part of the LAGs 208 and 212.)

The method 400 then proceeds to block 428 where the first aggregated networking device transmits a second maintenance completed notification message to the third aggregated networking device(s). FIG. 11 illustrates how the fabric maintenance support engine 304 in the aggregated networking device 202a/300 may generate and transmit second maintenance completed notification communications 1100 including second maintenance completed notification messages via its communication system 308 and to each of the core networking device 206 and the TOR networking device 210. In an example in which the second maintenance completed notification communications 1100 are LACP communications, the second maintenance completed notification communications 1100 may include the following code in order modify the LACP state machine to allow the sending of data traffic by the core networking device 206 and the TOR networking device 210 to the aggregated networking device 202a:

Enable_Maintenance(   );Actor.Sync=TRUE; ActorMaintenance=FALSE;ActorDistributing=TRUE; NTT=FALSE;wtr_waiting=TRUE As such, one of skill in the art in possession of the present disclosure will recognize that each of the core networking device 206 and the TOR networking device 210 may receive the second maintenance completed notification communications 1100 at block 428 and, in response, may transmit all further data traffic received subsequent to the second maintenance completed notification communications 1100 to either of the aggregated networking devices 202a and 202b using conventional aggregated networking device data traffic transmission techniques that would be apparent to one of skill in the art in possession of the present disclosure. The method 400 then proceeds to block 430 where the third networking device(s) transmit data traffic to the first aggregated networking device. In an embodiment, at block 430, the core networking device 206 and the TOR networking device 210 may operate to transmit data traffic to both the aggregated networking devices 202a and 202b. As will be appreciated by one of skill in the art in possession of the present disclosure, in embodiments in which the operation as the primary aggregated networking device was transferred from the aggregated networking device 202a to the aggregated networking device 202b, the operation as the primary aggregated networking device may be taken over from the aggregated networking device 202b by the aggregated networking device 202a.

Thus, systems and methods have been described that provide a first VLT peer switch device that, in response to receiving a maintenance instruction that indicates that the first VLT peer switch device is about to undergo maintenance, informs the second VLT peer switch device about that maintenance, and instructs other switch devices coupled to the VLT peer switch devices to suspend the transmittal of data traffic to the first VLT peer switch device so that data traffic is not lost during the maintenance operations. When the first VLT peer switch device determines that the maintenance operations have completed, it informs the second VLT peer switch device about the completion of the maintenance operations, and instructs other switch devices coupled to the VLT peer switch devices to resume the transmittal of data traffic to the first VLT peer switch device. As such, VLT peer switch device maintenance may be performed without the loss of data traffic and without the need for extensive manual user configuration operations associated with conventional VLT peer switch device maintenance systems. Furthermore, while the techniques of the present disclosure are discussed as being utilized to perform maintenance operations, one of skill in the art in possession of the present disclosure will appreciate that those techniques may be utilized to address routing failures in a VLT peer device, as well as other issues that would be apparent to one of skill in the art in possession of the present disclosure, while remaining within the scope of the present disclosure as well.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An aggregated networking device maintenance system, comprising:
 a third networking device;
 a second aggregated networking device that is coupled to the third networking device; and
 a first aggregated networking device that is coupled to the second aggregated networking device and the third networking device, wherein the first aggregated networking device is configured to:
  receive a maintenance instruction;
  transmit, in response to receiving the maintenance instruction:
   a first maintenance notification message to the second aggregated networking device; and
   a second maintenance notification message to the third networking device that is configured to prevent the third networking device from transmitting data traffic to the first aggregated networking device;
  perform maintenance operations based on the maintenance instruction;
  determine that the maintenance operations have completed; and
  transmit, in response to determining that the maintenance operations have completed:
   a first maintenance completed notification message to the second aggregated networking device; and a second maintenance completed notification message to the third networking device that is configured to cause the third networking device to resume transmitting data traffic to the first aggregated networking device.

2. The system of claim 1, wherein the first aggregated networking device is configured to:
receive, from the second aggregated networking device subsequent to sending the first maintenance notification message, second aggregated networking device configuration information; and
perform a maintenance check using first aggregated networking device configuration information and the second aggregated networking device configuration information.

3. The system of claim 2, wherein the first aggregated networking device is configured to:
determine that the maintenance check indicates that the first aggregated networking device has a lower data transmission capability than the second aggregated networking device and, in response, generate a maintenance warning.

4. The system of claim 1, wherein the first maintenance notification message to the second aggregated networking device is configured to cause the second aggregated networking device to take over operations as a primary aggregated networking device from the first aggregated networking device.

5. The system of claim 1, wherein the first maintenance completed notification message to the second aggregated networking device is configured to cause the second aggregated networking device to transmit control information to the first aggregated networking device, and wherein the first aggregated networking device is configured to:
synchronize the control information.

6. The system of claim 1, wherein the first aggregated networking device is configured to:
exchange, with the second aggregated networking device prior to receiving the maintenance instruction, maintenance capability information; and
determine, based on the maintenance capability information, that the second aggregated networking device is capable of interpreting the first maintenance notification message and the first maintenance completed notification message.

7. An Information Handling System (IHS), comprising:
a processing system; and
a memory system that is coupled to the processing system and that includes instructions that, when executed by the processing system, cause the processing system to provide a maintenance support engine that is configured to:
receive a maintenance instruction;
transmit, in response to receiving the maintenance instruction:
a first maintenance notification message to a second aggregated networking device; and
a second maintenance notification message to a third networking device that is coupled to the second aggregated networking device, wherein the second maintenance notification message is configured to prevent the third networking device from transmitting data traffic to a communication system that is connected to the processing system;
perform maintenance operations based on the maintenance instruction;
determine that the maintenance operations have completed; and
transmit, in response to determining that the maintenance operations have completed:
a first maintenance completed notification message to the second aggregated networking device; and
a second maintenance completed notification message to the third networking device that is configured to cause the third networking device to resume transmitting data traffic to the communication system that is connected to the processing system.

8. The IHS of claim 7, wherein the maintenance support engine is configured to:
receive, from the second aggregated networking device subsequent to sending the first maintenance notification message, second aggregated networking device configuration information; and
perform a maintenance check using the second aggregated networking device configuration information and first aggregated networking device configuration information that is stored in a database connected to the processing system.

9. The IHS of claim 8, wherein the maintenance support engine is configured to:
determine that the maintenance check indicates that the IHS has a lower data transmission capability than the second aggregated networking device and, in response, generate a maintenance warning.

10. The IHS of claim 7, wherein the first maintenance notification message to the second aggregated networking device is configured to cause the second aggregated networking device to take over operations as a primary aggregated networking device from the maintenance support engine.

11. The IHS of claim 7, wherein the first maintenance completed notification message to the second aggregated networking device is configured to cause the second aggregated networking device to transmit control information to the communication system connected to the processing system, and wherein the maintenance support engine is configured to:
synchronize the control information in a database that is connected to the processing system.

12. The IHS of claim 7, wherein the maintenance support engine is configured to:
exchange, with the second aggregated networking device prior to receiving the maintenance instruction, maintenance capability information; and
determine, based on the maintenance capability information, that the second aggregated networking device is capable of interpreting the first maintenance notification message and the first maintenance completed notification message.

13. The IHS of claim 7, wherein the maintenance support engine is configured to:
configure, in response to receiving the maintenance instruction, ports that are included in the communication system connected to the processing system and that are coupled to the third networking device in a maintenance state that does not accept data traffic from the third networking device; and
configure, in response to in response to determining that the maintenance operations have completed, the ports that are included in the communication system connected to the processing system and that are coupled to the third networking device in an operational state that accepts data traffic from the third networking device.

14. A method for performing maintenance on an aggregated networking device, comprising:
receiving, by a first aggregated networking device, a maintenance instruction;
transmitting, in response to receiving the maintenance instruction:
a first maintenance notification message to a second aggregated networking device that is coupled to the first aggregated networking device; and
a second maintenance notification message to a third networking device that is coupled to each of the first aggregated networking device and the second aggregated networking device, wherein the second maintenance notification message is configured to prevent the third networking device from transmitting data traffic to the first aggregated networking device;
performing, by the first aggregated networking device, maintenance operations based on the maintenance instruction;
determining, by the first aggregated networking device, that the maintenance operations have completed; and
transmitting, by the first aggregated networking device in response to determining that the maintenance operations have completed:
a first maintenance completed notification message to the second aggregated networking device; and
a second maintenance completed notification message to the third networking device that is configured to cause the third networking device to resume transmitting data traffic to the first aggregated networking device.

15. The method of claim 14, further comprising:
receiving, by the first aggregated networking device from the second aggregated networking device subsequent to sending the first maintenance notification message, second aggregated networking device configuration information; and
performing, by the first aggregated networking device, a maintenance check using first aggregated networking device configuration information and the second aggregated networking device configuration information.

16. The method of claim 15, further comprising:
determining, by the first aggregated networking device, that the maintenance check indicates that the first aggregated networking device has a lower data transmission capability than the second aggregated networking device and, in response, generate a maintenance warning.

17. The method of claim 14, wherein the first maintenance notification message to the second aggregated networking device is configured to cause the second aggregated networking device to take over operations as a primary aggregated networking device from the first aggregated networking device.

18. The method of claim 14, wherein the first maintenance completed notification message to the second aggregated networking device is configured to cause the second aggregated networking device to transmit control information to the first aggregated networking device, and wherein the method further comprises:
synchronizing, by the first aggregated networking device, the control information.

19. The method of claim 14, further comprising:
exchanging, by the first aggregated networking device with the second aggregated networking device prior to receiving the maintenance instruction, maintenance capability information; and
determining, by the first aggregated networking device based on the maintenance capability information, that the second aggregated networking device is capable of interpreting the first maintenance notification message and the first maintenance completed notification message.

20. The method of claim 14, further comprising:
configuring, by the first aggregated networking device in response to receiving the maintenance instruction, ports that are included in the first aggregated networking device and that are coupled to the third networking device in a maintenance state that does not accept data traffic from the third networking device; and
configuring, by the first aggregated networking device in response to determining that the maintenance operations have completed, the ports that are included in the first aggregated networking device and that are coupled to the third networking device in an operational state that accepts data traffic from the third networking device.

* * * * *